(12) United States Patent
Yang

(10) Patent No.: US 11,691,641 B2
(45) Date of Patent: Jul. 4, 2023

(54) VEHICLE AND METHOD OF CONTROLLING THE SAME

(71) Applicants: Hyundai Motor Company, Seoul (KR); Kia Corporation, Seoul (KR)

(72) Inventor: Heegun Yang, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/497,450

(22) Filed: Oct. 8, 2021

(65) Prior Publication Data

US 2022/0169275 A1 Jun. 2, 2022

(30) Foreign Application Priority Data

Nov. 30, 2020 (KR) .................. 10-2020-0164908

(51) Int. Cl.
| | |
|---|---|
| *G06T 7/70* | (2017.01) |
| *B60W 50/14* | (2020.01) |
| *B60W 30/08* | (2012.01) |
| *B60W 40/02* | (2006.01) |
| *B60W 60/00* | (2020.01) |
| *G06V 20/58* | (2022.01) |
| *G06V 40/20* | (2022.01) |

(52) U.S. Cl.
CPC ............ *B60W 50/14* (2013.01); *B60W 30/08* (2013.01); *B60W 40/02* (2013.01); *B60W 60/001* (2020.02); *G06T 7/70* (2017.01); *G06V 20/58* (2022.01); *G06V 40/28* (2022.01); *B60W 2030/082* (2013.01); *B60W 2050/143* (2013.01); *B60W 2050/146* (2013.01); *B60W 2554/4041* (2020.02); *G06T 2207/30252* (2013.01)

(58) Field of Classification Search
CPC ..................... B60W 30/08; G06T 2207/30252
See application file for complete search history.

(56) References Cited

U.S. PATENT DOCUMENTS

| | | | |
|---|---|---|---|
| 10,387,960 B2 * | 8/2019 | Tofte ..................... | G06Q 10/06 |
| 2013/0261880 A1 * | 10/2013 | Cho ..................... | G07C 5/0866 |
| | | | 701/32.4 |
| 2015/0066349 A1 * | 3/2015 | Chan .................. | G01C 21/3697 |
| | | | 701/400 |

* cited by examiner

*Primary Examiner* — Benyam Haile
(74) *Attorney, Agent, or Firm* — Slater Matsil, LLP

(57) ABSTRACT

An embodiment vehicle includes a camera configured to acquire an external appearance image of the vehicle, a first sensor provided on an outside of the vehicle and configured to detect a position of an object adjacent to the vehicle, an alarm configured to output an alarm notification, and a controller configured to determine a reference area based on the external appearance image of the vehicle and to control the alarm to output the alarm notification when the detected position of the object adjacent to the vehicle is within the reference area.

22 Claims, 10 Drawing Sheets

110: 111~119
120: 121~125

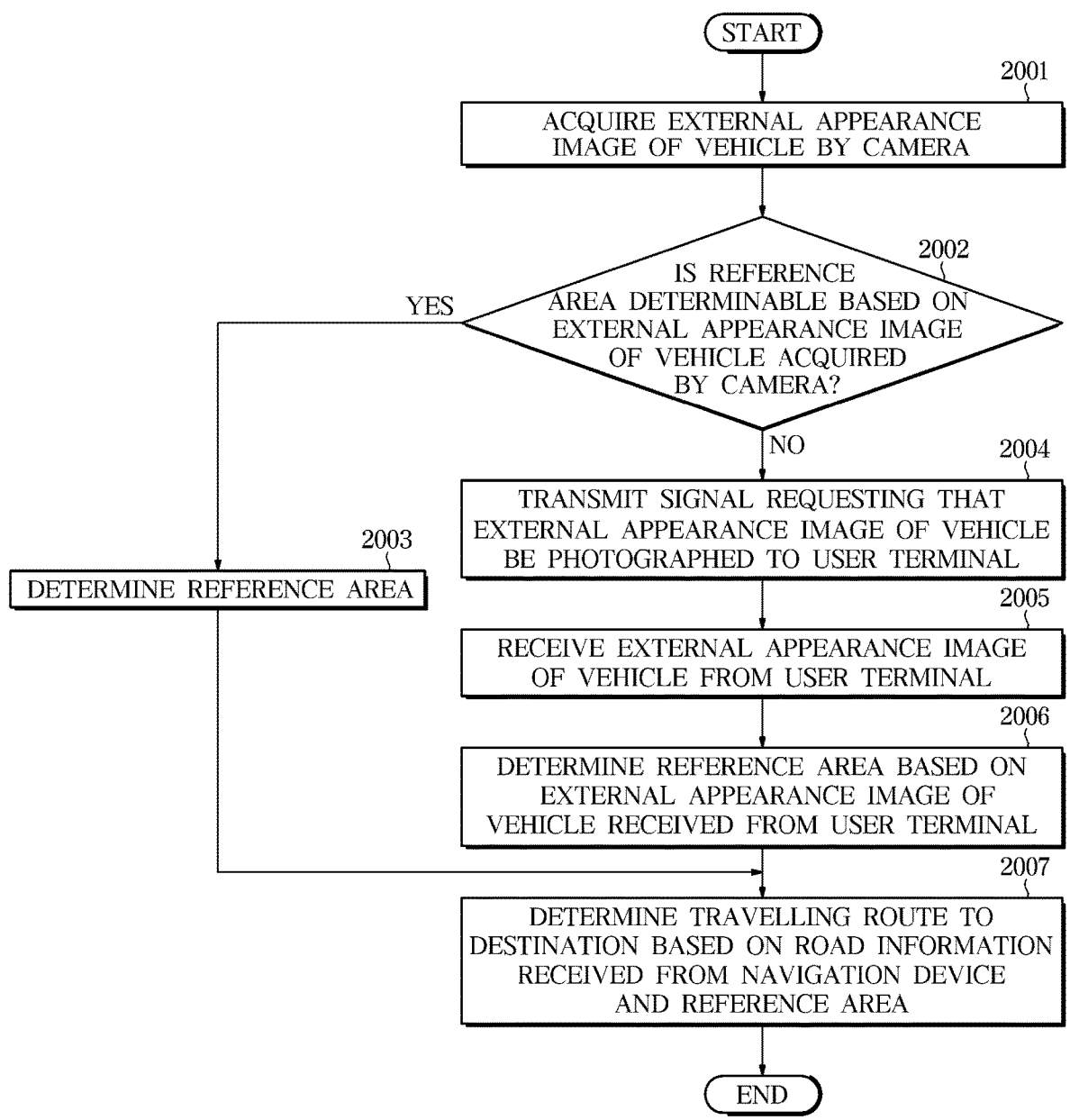

VEHICLE AND METHOD OF CONTROLLING THE SAME

CROSS-REFERENCE TO RELATED APPLICATIONS

This application claims the benefit of Korean Patent Application No. 10-2020-0164908, filed on Nov. 30, 2020, in the Korean Intellectual Property Office, which application is hereby incorporated herein by reference.

TECHNICAL FIELD

The disclosure relates to a vehicle and a method of controlling the same.

BACKGROUND

Generally, a vehicle refers to a device for movement or transportation, designed to travel on a road or railway using fossil fuel, electric power, and the like as a power source. For example, the vehicle may be driven using power generated by an engine.

Recently, with vehicle technology incorporating information technology (IT), there has been development of vehicles equipped with various additional functions to increase driver safety and convenience.

In addition, in order to reduce a driver's burdens and improve convenience, research is actively conducted on vehicles equipped with an advanced driver assistance system (ADAS) that actively provides information about the surrounding environment through various types of sensors provided in the vehicle.

SUMMARY

The disclosure relates to a vehicle and a method of controlling the same. Particular embodiments relate to a vehicle and a method of controlling the same in which a reference area for alerting a driver is variable according to a load or a mounting object outside the vehicle.

Therefore, an embodiment of the disclosure provides a vehicle capable of changing an alarm area of a sensor provided in a vehicle to prevent a collision when a load is piled on an outside of the vehicle, and a method of controlling the same.

Additional embodiments of the disclosure will be set forth in part in the description which follows and, in part, will be obvious from the description, or may be learned by practice of the disclosure.

According to an embodiment of the disclosure, there is provided a vehicle including a camera configured to acquire an external appearance image of the vehicle, a first sensor provided outside the vehicle and configured to detect a position of an object adjacent to the vehicle, an alarm configured to output an alarm notification, and a controller configured to determine a reference area based on the external appearance image of the vehicle, and control the alarm to output the alarm notification when the detected position of the object adjacent to the vehicle is included in the reference area.

The controller may be configured to determine the reference area based on information about a load piled on an outside of the vehicle and included in the external appearance image of the vehicle.

The vehicle may further include a short-range communication module configured to receive a signal from a digital key, and the controller may be configured to control the camera to acquire the external appearance image of the vehicle based on the signal.

The vehicle may further include a second sensor configured to detect an impact applied to the vehicle, wherein the controller may be configured to control the camera to acquire the external appearance image of the vehicle when the impact is detected.

The camera may be configured to acquire a gesture image of a user, and the controller may be configured to determine the reference area based on the gesture image of the user.

The controller may be configured to determine a position indicated by the user based on the gesture image of the user and determine the reference area based on the position indicated by the user.

The controller may be configured to, when the determination of the reference area is not performable based on the external appearance image of the vehicle acquired by the camera, control the camera to acquire the gesture image of the user.

The vehicle may further include a communicator configured to communicate with a user terminal, wherein the controller may determine the reference area based on the external appearance image of the vehicle received from the user terminal.

The controller may be configured to, when the determination of the reference area is not performable based on the external appearance image of the vehicle acquired by the camera, control the communicator to transmit a signal requesting that the external appearance image of the vehicle be photographed to the user terminal.

The vehicle may further include a driving part configured to provide a rotational force for travel, wherein the controller may be configured to receive road information from a navigation system, generate a command to control autonomous driving of the vehicle based on the reference area and the road information, and output the command to control the autonomous driving to the driving part.

The controller may be configured to determine a travelling route to a destination based on the reference area and the road information and output, to the driving part, the command to control the autonomous driving so that the vehicle travels along the travelling route.

According to another embodiment of the disclosure, there is provided a method of controlling a vehicle, the method including acquiring an external appearance image of the vehicle, determining a reference area based on the external appearance image of the vehicle, detecting a position of an object adjacent to the vehicle, and controlling an alarm to output an alarm notification when the detected position of the object adjacent to the vehicle is included in the reference area.

The determining of the reference area may include determining the reference area based on information about a load piled on an outside of the vehicle and included in the external appearance image of the vehicle.

The method may further include receiving a signal from a digital key and controlling a camera to acquire the external appearance image of the vehicle based on the signal.

The method may further include detecting an impact applied to the vehicle and controlling a camera to acquire the external appearance image of the vehicle when the impact is detected.

The method may further include acquiring a gesture image of a user and determining the reference area based on the gesture image of the user.

The determining of the reference area based on the gesture image of the user may include determining a position indicated by the user based on the gesture image of the user and determining the reference area based on the position indicated by the user.

The acquiring of the gesture image of the user may include, when the determination of the reference area is not performable based on the external appearance image of the vehicle acquired by the camera, controlling the camera to acquire the gesture image of the user.

The method may further include determining the reference area based on the external appearance image of the vehicle received from a user terminal.

The method may further include, when the determination of the reference area is not performable based on the external appearance image of the vehicle acquired by the camera, controlling a communicator to transmit a signal requesting that the external appearance image of the vehicle be photographed to the user terminal.

The method may further include receiving road information from a navigation system, generating a command to control autonomous driving of the vehicle based on the reference area and the road information, and outputting the command to control the autonomous driving to a driving part.

The outputting of the command to control the autonomous driving to the driving part may include determining a travelling route to a destination based on the reference area and the road information and outputting, to the driving part, the command to control the autonomous driving so that the vehicle travels along the travelling route.

BRIEF DESCRIPTION OF THE DRAWINGS

These and/or other embodiments of the disclosure will become apparent and more readily appreciated from the following description of the exemplary embodiments, taken in conjunction with the accompanying drawings, in which:

FIG. 8 is a flowchart showing a control method for setting a travelling route according to an embodiment.

DETAILED DESCRIPTION OF ILLUSTRATIVE EMBODIMENTS

Figure 1:
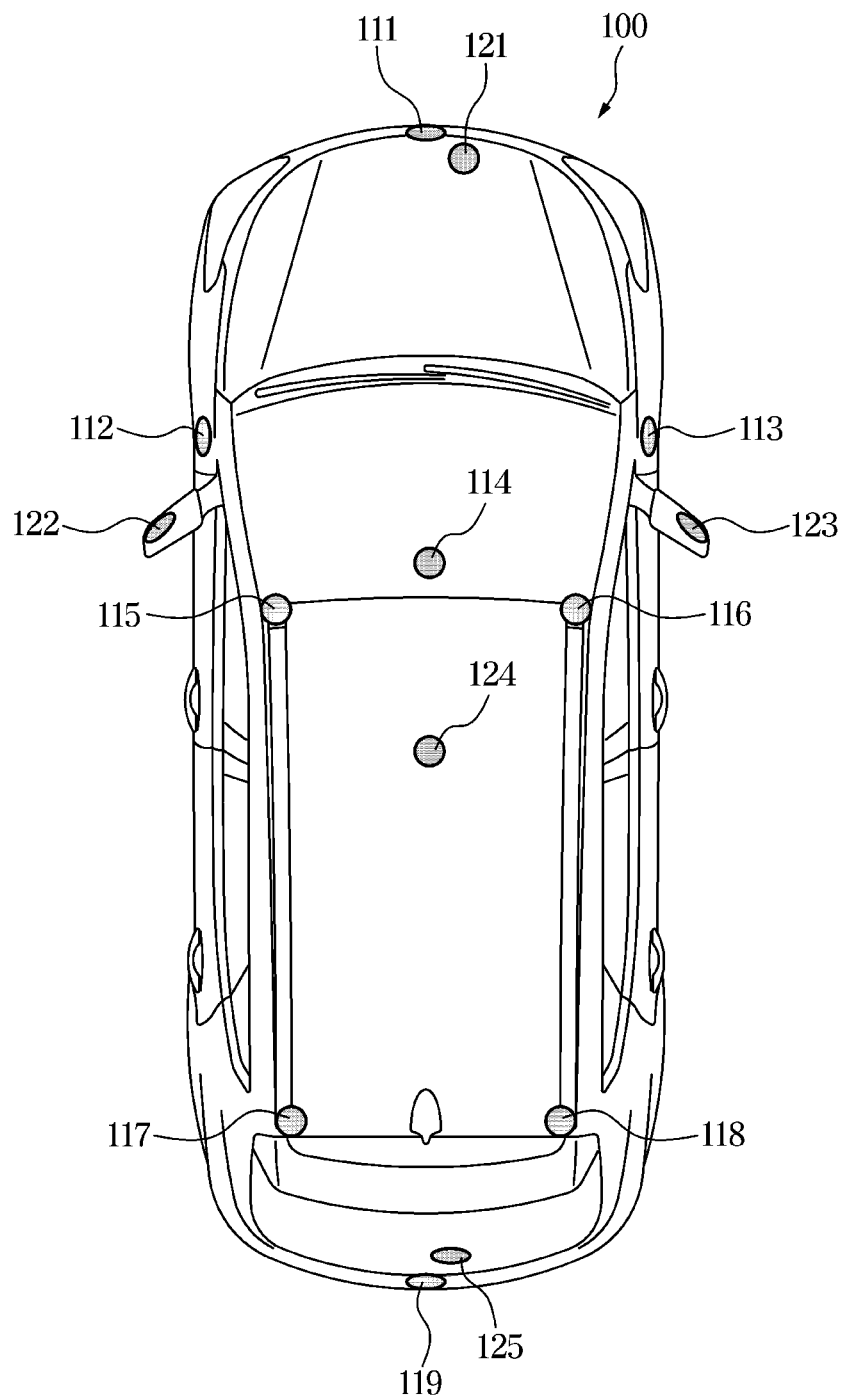
FIG. 1 is a view illustrating the external appearance of a vehicle according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, In the specification, it will be understood that, when a member is referred to as being "on/under" another member, it may be directly on/under the other member, or one or more intervening members may also be present.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

FIG. 1 is a view illustrating the external appearance of a vehicle according to an embodiment.

Referring to FIG. 1, a camera 110 of a vehicle 100 may be at least one camera 111 to 119 provided outside the vehicle 100.

The camera 110 may acquire an image of an object and provide image data to various components in the vehicle 100. The camera 110 may include the cameras 111 to 119 provided on the front side, lateral sides, and rear side of outside of the vehicle 100. The cameras 111 to 119 provided on the front side, lateral sides, and rear side on the outside of the vehicle 100 may be used to analyze images of surroundings of the vehicle 100 or to identify the travelling state of the vehicle 100, and may assist the vehicle 100 with travelling.

A first sensor 120 may include at least one of a radar sensor, a LIDAR sensor, and a camera sensor, each of which may be provided in plural in the vehicle 100 as needed. In this case, a camera sensor that may be included in the first sensor 120 may include the cameras 111 to 119 provided on the front side, lateral sides, and rear side on the outside of the vehicle 100.

The first sensor 120 may include sensors 121 to 125 provided on the front side, lateral sides, and rear side on the outside of the vehicle 100.

The radar sensor refers to a detection sensor capable of irradiating an object with electromagnetic waves (e.g., radio waves, microwaves, etc.) and receiving the electromagnetic waves reflected from the object to identify the distance, direction, altitude, speed, etc. of the object. The radar sensor may include a radar antenna for transmitting electromagnetic waves or receiving electromagnetic waves reflected from an object.

The LIDAR sensor refers to a detection sensor that irradiates an object with a laser having a wavelength shorter than that of electromagnetic waves (for example, infrared or visible light) and receives light reflected from the object to identify the distance, direction, altitude, speed, etc. of the object. The LIDAR sensor may include a light source for transmitting a laser and a receiver for receiving reflected light.

When the first sensor 120 is a LIDAR sensor, the LIDAR sensor may include sensors 121, 122, 123, and 125 provided on the front side, lateral sides, and rear side on the outside of the vehicle 100. In this case, the LIDAR sensors 121, 122, 123, and 125 provided on the front side, lateral sides, and rear side on the outside of the vehicle 100 may detect the position and distance of an object located outside the vehicle 100, and may assist with travelling of the vehicle 100.

The LIDAR sensor may be a circular LIDAR sensor 124 provided on a roof of the vehicle 100. The circular LIDAR sensor 124 provided on the roof of the vehicle 100 may be used to collect three dimensional (3D) images of surroundings of the vehicle 100, and may detect an object adjacent to the vehicle 100 and a distance of the object.

However, the type, number, and position of the first sensors 120 are not limited thereto, and fewer or more first sensors 120 may be installed in various positions of the vehicle 100 depending on the specifications or performance of the vehicle 100. Each of the plurality of first sensors 120 may be provided at a preset position of the vehicle 100.

Figure 2:
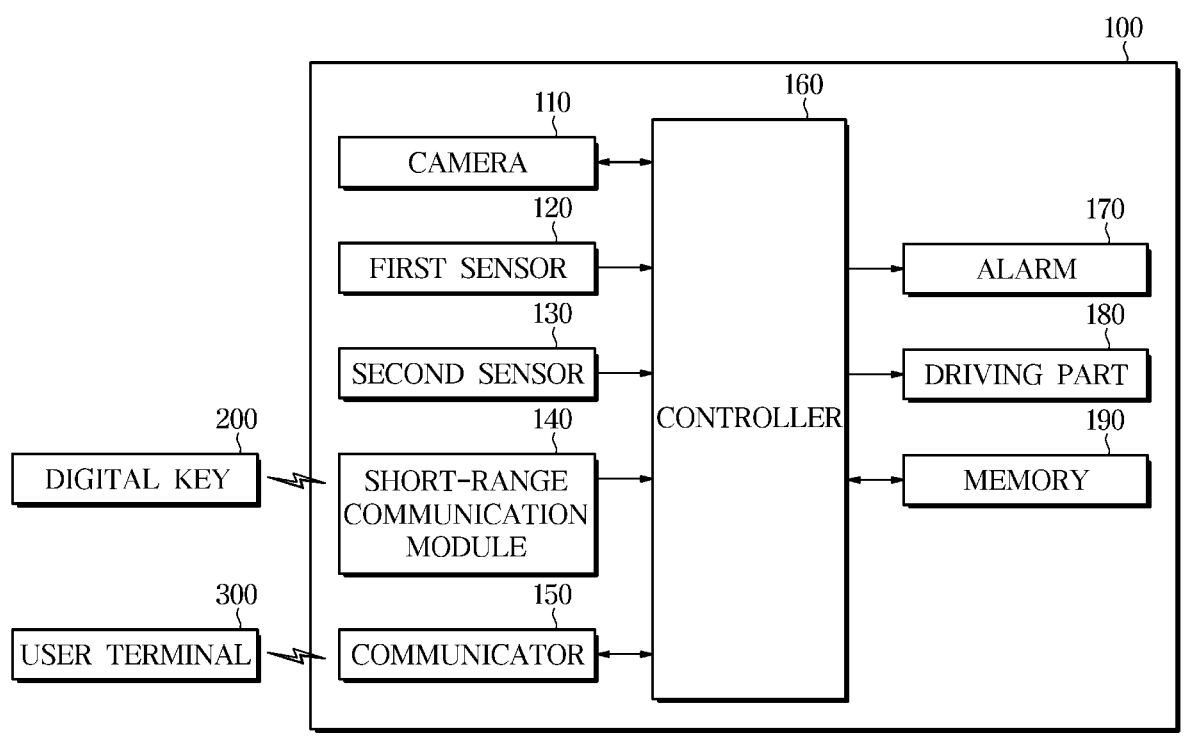
FIG. 2 is a control block diagram illustrating a vehicle according to an embodiment.
Figure 3:
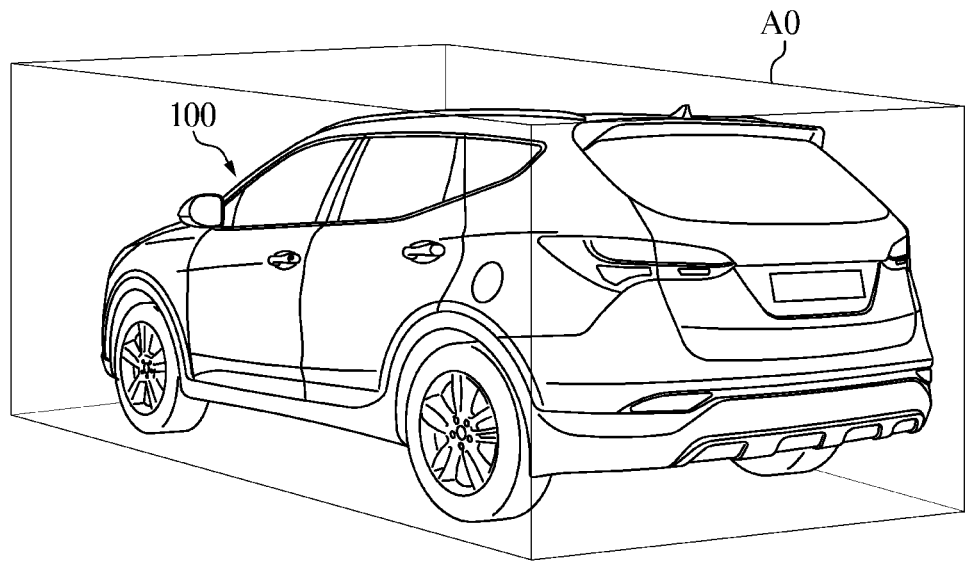
FIG. 3 is a view for describing a change of a reference area according to an embodiment.
Figure 3:
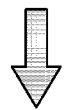
Figure 3:
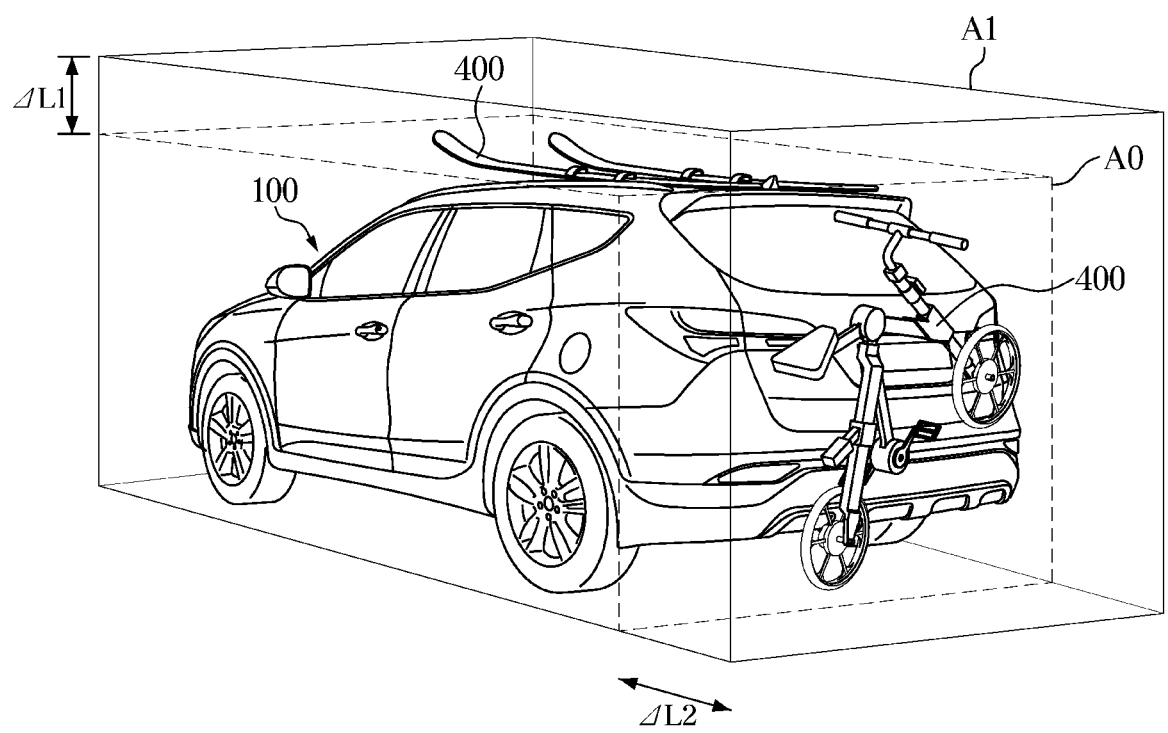

FIG. 2 is a control block diagram illustrating a vehicle according to an embodiment, and FIG. 3 is a view for describing a change of a reference area according to an embodiment.

Referring to FIG. 2, a vehicle 100 according to an embodiment may include a camera 110, a first sensor 120, a second sensor 130, a short-range communication module 140, a communicator 150, a controller 160, an alarm 170, a driving part 180, and a memory (i.e., a storage) 190.

A dashboard and a gearbox may be provided inside the vehicle 100. A display may be installed on a center panel of the dashboard. The display may provide various pieces of information to a driver or a passenger of the vehicle 100 through images. For example, the display may visually provide various pieces of information, such as a map, weather, news, various moving images or still images, and various pieces of information related to the state or operation of the vehicle 100.

An audio video navigation (AVN) device may be provided inside the vehicle 100.

The AVN device is a device that incorporates audio and video devices and a navigation device in the vehicle 100 as one system, and may provide a navigation service for guiding a route to a destination for a user.

The first sensor 120 may be provided outside the vehicle 100 to detect the position of an object adjacent to the vehicle 100. In this case, the first sensor 120 may transmit information about the detected position of the object adjacent to the vehicle 100 to the controller 160.

The second sensor 130 may detect an impact applied to the vehicle 100. The second sensor 130 may be an impact sensor capable of detecting an impact occurring when a load is piled on the outside of the vehicle 100.

The second sensor 130 may include at least one of an acceleration sensor, a gyro sensor, or a vibration sensor. The second sensor 130 may be provided in any position of the vehicle 100 as long as it can detect an impact applied by the user. The second sensor 130 may transmit information about the detected impact to the controller 160.

The short-range communication module 140 may include a Near Field Communication (NFC) communication module or a Bluetooth Low Energy (BLE) communication module.

The short-range communication module 140 may be provided at any position in the vehicle 100 as long as it allows a short range communication between a digital key 200 possessed by the user and the vehicle 100 when the digital key 200 approaches the vehicle 100.

The short-range communication module 140 may receive a signal from the digital key 200 through short-distance communication.

The digital key 200 may include a FOB key of the vehicle 100 and/or a user terminal 300. The user terminal 300 may interoperate with the vehicle 100 through communication with the vehicle 100, and may include a portable terminal capable of accessing the vehicle 100 through a network. For example, the user terminal 300 includes all types of hand-held-based wireless communication devices, such as smart phones, and a wearable device, such as a watch, a ring, a bracelet, an ankle bracelet, a necklace, glasses, a contact lens, or a head-mounted-device (HMD).

The short-range communication may be NFC communication. NFC communication is one of radio tag (radio frequency identification: RFID) technologies that is a communication technology for exchanging wireless data in a short distance within 10 cm. Due to the communication distance being short, the short-range communication is considered a technology having a relatively superior security and a low price.

Short-range communication may be BLE communication. BLE communication is a communication technology that enables low-power wireless communication between information devices separated from each other in a range of several meters to several tens of meters.

The communicator 150 may transmit various signals and information to the user terminal 300 or receive various signals and information from the user terminal 300 through a wireless communication network.

Here, the wireless communication network refers to a communication network capable of transmitting and receiving signals wirelessly. For example, the wireless communication network includes a 3G communication network, a 4G communication network, a 5G communication network, and the like, but is not limited thereto.

The communicator 150 may transmit signals and information received from the user terminal 300 to the controller 160.

The alarm 170 may output an alarm notification to alert the user.

The alarm 170 may output the alarm notification by displaying the alarm notification on a display provided in the vehicle 100 or in the form of sound through a speaker provided in the vehicle 100. However, the method of providing the alarm notification by the alarm 170 is not limited thereto as long as it can alert the user that the vehicle 100 is in a dangerous state.

Recently, vehicles may assist a user in driving based on information acquired by cameras and sensors. For example, sensors of the vehicle may detect an object adjacent to the vehicle, and the vehicle may output an alarm notification to the user that the vehicle is in a risk of collision when the detected object is included in a reference area set in a surrounding of the vehicle.

In addition, recently, vehicles may travel to a destination with fully autonomous driving based on information acquired by cameras and sensors without a user being involved in driving. Even in this case, sensors provided in the vehicle may detect an object adjacent to the vehicle, and the vehicle may travel so that the detected object is not included in a reference area set in a surrounding of the vehicle.

However, once a reference area, which is a criterion for identifying a risk of collision with objects adjacent to the vehicle, is set when the vehicle is shipped, the reference area is not changed. That is, when a load and a carrier are mounted on the outside of the vehicle in the existing vehicle, the reference area set at the time of shipment does not change even though the volume, such as the length, height, and width of the vehicle, changes. Accordingly, when an alarm output or autonomous driving is based on the existing reference area even when a load and a carrier are mounted on the outside of the vehicle, the vehicle may travel to a region that is impassable by the vehicle.

According to an embodiment of the disclosure, when the length, height, and width of the vehicle 100 are changed due to a load and a carrier mounted on the outside of the vehicle 100 or any other reasons, the reference area is set to vary so that the above-described constraints are resolved.

The camera 110 may be provided on the outside of the vehicle 100 to acquire an external appearance image of the vehicle 100. In this case, the external appearance image of the vehicle 100 may include information about a load 400 piled on the outside of the vehicle 100. That is, the camera 110 may acquire an image of the load 400 piled on the outside of the vehicle 100.

The controller 160 may determine a reference area based on the external appearance image of the vehicle 100 acquired by the camera 110.

The reference area may be an area set in a surrounding area of the vehicle 100. That is, the reference area may be an area that serves as a criterion for the controller 160 to identify that there is a possibility of a collision between the vehicle 100 and an object adjacent to the vehicle 100.

The controller 160 may determine the reference area based on the external appearance image of the vehicle 100. In this case, the controller 160 may determine the reference area based on the information about the load piled on the outside of the vehicle 100 and included in the external appearance image of the vehicle 100.

In response to a load being piled on the outside of the vehicle 100, the controller 160 may set a reference area A1 to have a range increased compared to a reference area A0 in which a load is not piled on the outside of the vehicle 100.

The controller 160 may control the alarm 170 to output an alarm notification when the detected position of the object adjacent to the vehicle 100 is included in the reference area.

That is, the user may identify through the alarm notification whether the vehicle 100 is likely to collide with the nearby object while travelling or parking.

For example, in a case in which the vehicle 100 passes under a bridge with a low height, when the bridge with the low height is not included in the reference area, the vehicle 100 is unlikely to collide with the bridge, and thus the alarm notification may not be output. However, when the bridge with the low height is included in the reference area, the vehicle 100 is likely to collide with the bridge, and thus an alarm notification may be output.

In addition, in a case in which the vehicle 100 is parked in a narrow parking space with obstacles on both sides of the vehicle 100, when the obstacles on both sides are not included in the reference area, the vehicle 100 is unlikely to collide with the obstacles, and thus an alarm notification may not be output. However, when the obstacles are included in the reference area, the vehicle 100 is likely to collide with the obstacles, and thus an alarm notification may be output.

When an alarm notification is output based on a reference area that does not consider an outside load even with a load being piled on an outside of the vehicle 100, an alarm notification may not be output in response to the position of an object adjacent to the vehicle 100 not being included in the reference area. When the vehicle 100 travels in such a state, the load piled on the outside of the vehicle 100 may collide with an object adjacent to the vehicle 100.

However, the controller 160 may set the reference area A1 in consideration of the load piled on the outside of the vehicle 100. In this case, the position of the object adjacent to the vehicle 100 may be included in the reference area A1 that is set in consideration of the load piled on the outside of the vehicle 100, and the controller 160 may control the alarm 170 to output an alarm notification. Accordingly, the user may travel so that the load outside the vehicle 100 does not collide with an object adjacent to the vehicle 100.

The driving part 180 may provide a rotational force for the vehicle 100 to travel. The driving part 180 may include a steering device, a brake, and an accelerator, but is not limited thereto and may include other components of the vehicle 100.

During autonomous driving of the vehicle 100, the controller 160 may control the traveling of the vehicle 100 by transmitting signals to the steering device, the brake, and the accelerator. That is, the controller 160 may receive an output value generated by the first sensor 120, and transmit a control command of the vehicle 100 generated according to a control algorithm to the driving part 180, and the driving part 180 may operate according to the received control command.

The controller 160 may generate a route from the current position acquired through a Global Positioning System (GPS) receiver to the destination during autonomous driving of the vehicle 100, and control the driving part 180 to drive the vehicle 100 along the generated route.

The GPS receiver of the vehicle 100 may receive GPS information transmitted by a GPS satellite. The GPS receiver may transmit GPS information to the controller 160. When the GPS receiver transmits the GPS information to the controller 160, the controller 160 may compare the time information contained in the GPS information transmitted by the GPS satellite with the time at which the GPS receiver receives the GPS information to calculate the distance between the satellite and the GPS receiver, and may identify the current position of the GPS receiver based on the calculated distance. In this case, the controller 160 may represent the current position of the GPS receiver as position coordinates on the absolute coordinate system. Based on the GPS information received as described above, the controller 160 of the vehicle 100 may generate position information of the vehicle 100.

The navigation device may provide the user with information about a specific place in the form of a map, text, or various symbols. The navigation device may output position information of the destination and information about the estimated time required to reach the destination. In this case, the navigation device may output information to a screen through the display or output information by a speech through a speaker provided in the vehicle 100.

Meanwhile, the navigation device may not need to be installed in the AVN device and the vehicle 100. For example, the navigation device may be the user terminal 300 in which a navigation application is installed, and may include various devices for communicating with the vehicle 100 through the communicator 150.

The navigation device may identify position information of the vehicle 100 and travelling information of the vehicle by matching the position coordinates of the vehicle 100 identified through GPS information with a map stored in advance, and transmit the identified position information and travelling information of the vehicle 100 to the controller 160. To this end, the navigation device according to an embodiment may include a GPS receiver for receiving satellite signals.

In addition, the memory 190 may store a map, and since the map provided by the memory 190 includes attribute information for each road, the navigation device may identify information about a road on which the vehicle 100 is located, that is, information about a road being travelled on.

In addition, the navigation device may identify traveling environment information of a predetermined travelling route. Here, the travelling route may include a travelling route determined in advance according to a destination input from the outside through an inputter and a Most Probable Path (MPP) determined according to a probability without a destination being input.

In this case, the identified traveling environment information may refer to an environmental condition for performing autonomous driving, and may include, for example, forward speed enforcement camera information, forward speed bump information, front road slope information, front road curvature information, etc. However, the disclosure is not limited thereto.

Full-autonomous driving may refer to driving in which the vehicle 100 autonomously travels on a road without involvement of a driver. The key pails of autonomous driving may correspond to the first sensor 120 acquiring information required for travel, such as a radar sensor, a LIDAR sensor, and a camera sensor, and the controller 160 processing the acquired information.

The controller 160 may receive road information from the navigation device and generate a command to control autonomous driving of the vehicle 100 based on the reference area and the road information.

The road information may include information about obstacles that may interfere with travelling of the vehicle 100, such as width information of the road and height information of a bridge through which the road extends, and the like.

The controller 160 may generate a command to control autonomous driving of the vehicle 100 so that an obstacle is not included in the reference area during travel of the vehicle 100 based on the information about the obstacle. In this case, the controller 160 may output the command to control autonomous driving to the driving part 180.

The controller 160 may determine a travelling route to the destination based on the reference area and the road information.

The controller 160 may determine the travelling route so as not to travel on a road in which an obstacle is likely to be included in the reference area based on the road information. In this case, the controller 160 may output a command to control autonomous driving to the driving part 180 so that the vehicle 100 travels along the travelling route.

The controller 160 performing the above-described operation or an operation to be described below may include at least one memory for storing data for an algorithm or a program representing the algorithm for controlling the operations of components in the vehicle 100 and at least one processor for executing the above-described operation using the data stored in the at least one memory.

The memory 190 may store a program for performing the above-described operation and an operation to be described below, and the processor may execute the stored program. When the memory 190 and the processor are provided in plural, the memory 190 and the processor may be integrated in one chip, or may be provided in physically separate locations. The memory 190 may include a volatile memory, such as a static random access memory (SRAM) or a dynamic random access memory (DRAM) for temporarily storing data. In addition, the memory 190 may include a non-volatile memory, such as a Read Only Memory (ROM), an Erasable Programmable Read Only Memory (EPROM), and an Electrically Erasable Programmable Read Only Memory (EEPROM), for long-term storage of control programs and control data. The processor may include various logic circuits and arithmetic circuits, process data according to a program provided from the memory 190, and generate a control signal according to a processing result.

FIG. 3 is a view for describing a change of a reference area according to an embodiment.

Referring to FIG. 3, in response to no load being piled on the outside of the vehicle 100, the controller 160 may determine a vehicle reference area A0 as the reference area. That is, in this case, the controller 160 may control the alarm 170 to output an alarm notification when the position of an object adjacent to the vehicle 100 is included in the reference area A0 of the vehicle 100.

In response to a load 400 being piled on an outside of the vehicle 100, the controller 160 may determine a reference area A1 in consideration of the load as the reference area. The reference area A1 in consideration of the load may have a range wider than that of the vehicle reference area A0. In this case, the controller 160 may control the alarm 170 to output an alarm notification when the position of an object adjacent to the vehicle 100 is included in the reference area A1 in consideration of the load.

When assuming that an alarm notification is output based on the vehicle reference area A0 while the load 400 is piled on the outside of the vehicle 100, no alarm notification may be output in response to an object adjacent to the vehicle 100 not being included in the vehicle reference area A0 even though being included in the reference area A1 that considers the load. In this case, the load mounted on the outside of the vehicle 100 may collide with the object adjacent to the vehicle 100.

However, when a load 400 piled on an outside of the vehicle 100 exists, the controller 160 may determine the reference area A1 considering the load as the reference area, and may control the alarm 170 to output an alarm notification in response to the position of an object adjacent to the vehicle 100 being included in the reference area A1 considering the load, so that the vehicle may travel so that the load outside the vehicle 100 does not collide with the object adjacent to the vehicle 100.

The controller 160 may determine the reference area based on the position and size of the load. In this case, as the size of the load increases, the reference area may also increase in the direction in which the load is located.

When a load is piled on the upper side of the vehicle 100, the reference area A1 in consideration of the load may increase in height compared to the vehicle reference area A0.

For example, when skis 400 are piled on the upper side of the vehicle 100, the reference area A1 in consideration of the load may increase in height by a size ΔL1 compared to the vehicle reference area A0. In this case, the size ΔL1 may be determined based on a part furthest from the vehicle 100, that is, the highest part of the skis 400.

When a load is piled on the rear side of the vehicle 100, the reference area A1 in consideration of the load may increase in length toward the rear of the vehicle 100 compared to the vehicle reference area A0.

For example, when a bicycle 400 is piled on the rear side of the vehicle 100, the reference area A1 in consideration of the load may increase in length toward the rear of the vehicle 100 by a size ΔL2 compared to the vehicle reference area A0. In this case, the size ΔL2 may be determined based on a position of a part of the bicycle 400 that is furthest from the vehicle 100.

In conclusion, the reference area may be determined based on the most protruding part of the load. In this case, as the most protruding part of the load is getting farther from the vehicle 100, the range of the reference area may increase.

Figure 4A:
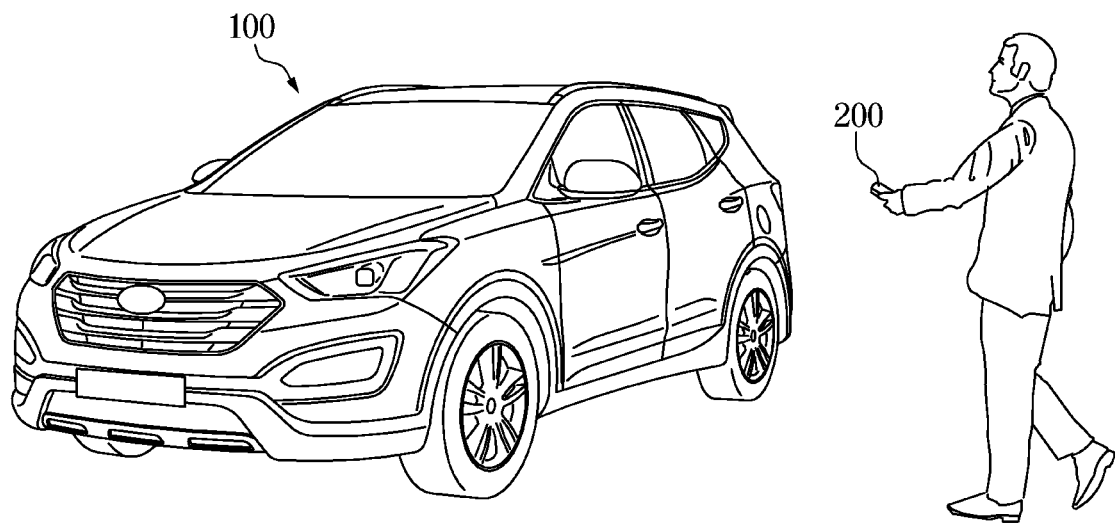
FIG. 4A is a diagram for describing a situation in which a digital key approaches a vehicle according to an embodiment.
Figure 4B:
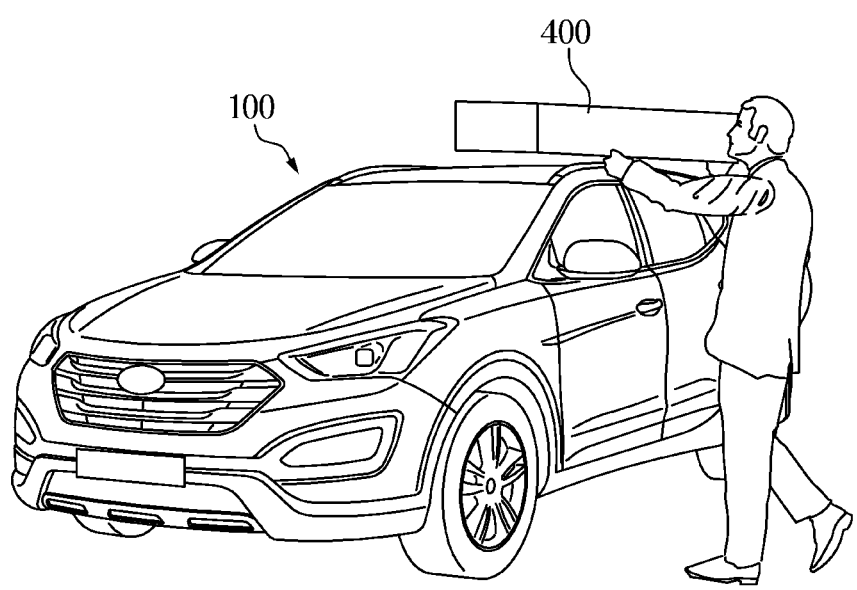
FIG. 4B is a view for describing a situation in which a load is piled on an outside of a vehicle according to an embodiment.

FIG. 4A is a diagram for describing a situation in which a digital key approaches a vehicle according to an embodiment, and FIG. 4B is a view for describing a situation in which a load is piled on the outside of a vehicle according to an embodiment.

Referring to FIG. 4A, the user may access the vehicle 100 while holding a digital key 200.

The short-range communication module may receive a signal from the digital key 200. That is, the short-range communication module may receive a signal from the digital key 200 when the digital key 200 approaches the vehicle 100.

The controller 160 may control the camera 110 to acquire an external appearance image of the vehicle 100 when the short-range communication module receives a signal from the digital key 200. That is, when the user approaches the vehicle 100 while holding the digital key 200, the camera 110 may acquire an external appearance image of the vehicle 100, and the controller 160 may determine the reference area based on the acquired external appearance image of the vehicle 100.

Referring to FIG. 4B, the user may pile a load 400 on the outside of the vehicle 100. In this case, when the user piles the load 400 on the outside of the vehicle 100, an impact may be applied to the vehicle 100, and in this case, the second sensor 130 may detect the impact.

The controller 160 may control the camera 110 to acquire an external appearance image of the vehicle 100 when the second sensor 130 detects an impact. That is, when the user piles the load 400 on the outside of the vehicle 100, the camera 110 may acquire an external appearance image of the vehicle 100, and the controller 160 may determine the reference area based on the acquired external appearance image of the vehicle 100.

Meanwhile, the reference area may not be determined based on the external appearance image of the vehicle 100 acquired by the camera 110 provided outside the vehicle 100. For example, a load outside the vehicle 100 may be located in a blind spot of the camera 110. In addition, the most important criterion for determining the reference area is the position of the most protruding part of the load 400, but the camera 110 may have a difficulty in acquiring the position information of the protruding part.

Figure 5A:
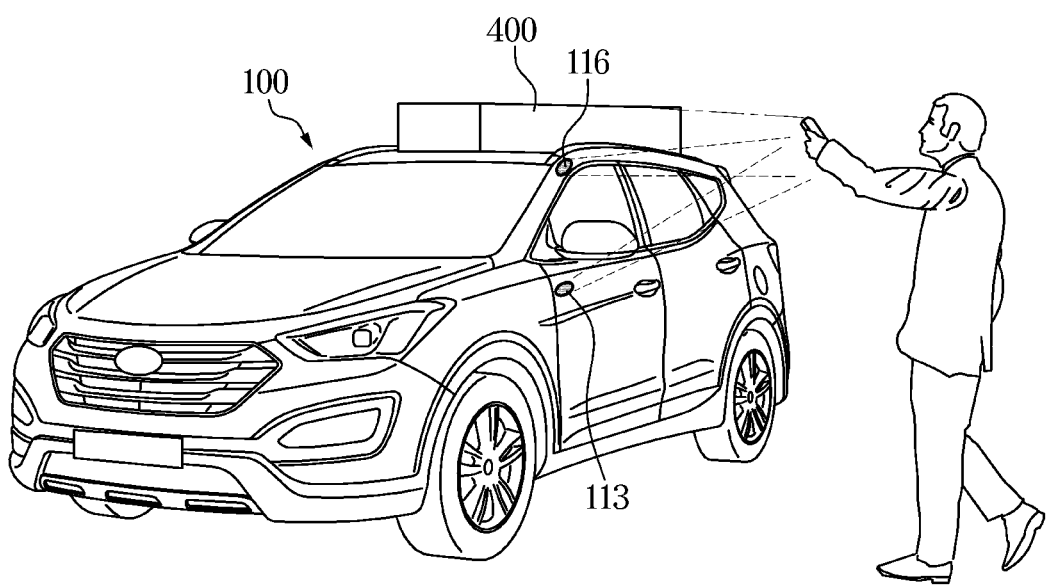
FIG. 5A is a diagram for describing an operation of determining a reference area based on a gesture image of a user according to an embodiment.
Figure 5B:
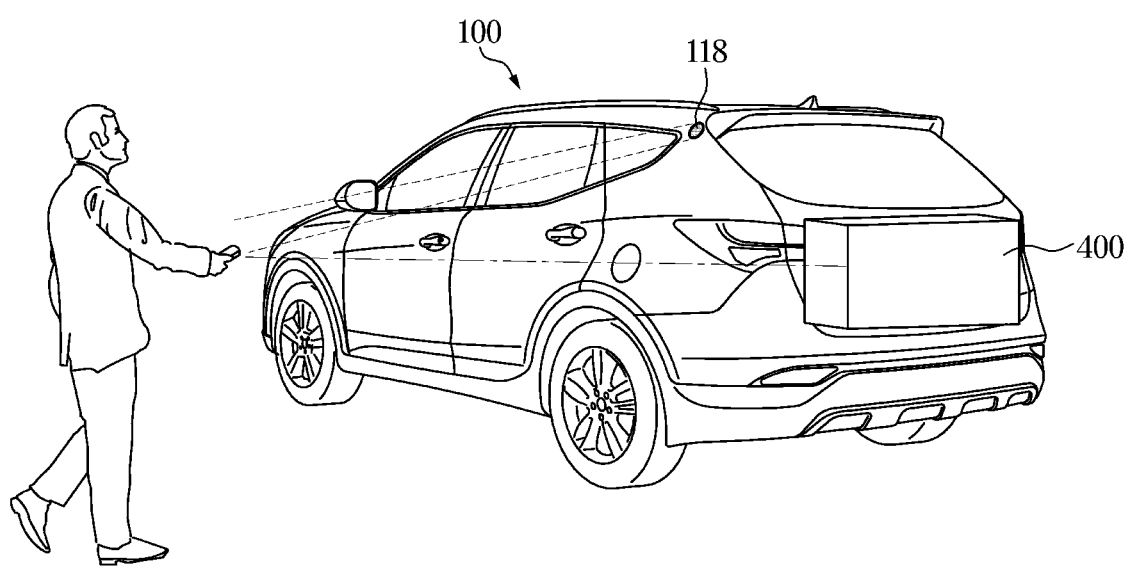
FIG. 5B is a diagram for describing an operation of determining a reference area based on a gesture image of a user according to another embodiment.

FIG. 5A is a diagram for describing an operation of determining a reference area based on a gesture image of a user according to an embodiment, and FIG. 5B is a diagram for describing an operation of determining a reference area based on a gesture image of a user according to another embodiment.

Referring to FIGS. 5A and 5B, the camera 110 may acquire a gesture image of a user, and the controller 160 may determine the reference area based on the gesture image of the user.

The controller 160 may control the camera 110 to acquire the gesture image of the user when determination of the reference area is not performable based on the external appearance image of the vehicle 100 acquired by the camera 110.

That is, the controller 160 may control the camera 110 to acquire the gesture image of the user when the camera 110 fails to acquire the position information of the most protruding part of the load located outside the vehicle 100.

For example, the user may make a gesture with his/her hand at a position where the camera 110 may take a picture. In this case, the user may make a gesture of placing the hand at a position that may indicate the most protruding part of the load located outside of the vehicle 100.

Referring to the embodiment of FIG. 5A, the user may make a gesture with his/her hand while standing on the lateral side of the vehicle 100. In this case, the user may make a gesture indicating the most protruding part of the load piled on the vehicle 100, that is, the part of the load furthest from the vehicle 100.

In this case, the side cameras 113 and 116 of the vehicle 100 may acquire the gesture image of the user.

The controller 160 may determine the position indicated by the user, that is, the position in which the load is most protruded, based on the gesture image of the user, and the controller 160 may determine the reference area based on the position indicated by the user.

Referring to the embodiment of FIG. 5B, the user may stand on the lateral side of the vehicle 100 and make a gesture indicating the most protruding part of the load piled on the rear side of the vehicle 100, that is, the part of the load farthest from the vehicle 100.

In this case, the side camera 118 of the vehicle 100 may acquire the gesture image of the user.

The controller 160 may determine the position indicated by the user, that is, the position in which the load is most protruded, based on the user's gesture image, and the controller 160 may determine the reference area based on the position indicated by the user.

Figure 6:
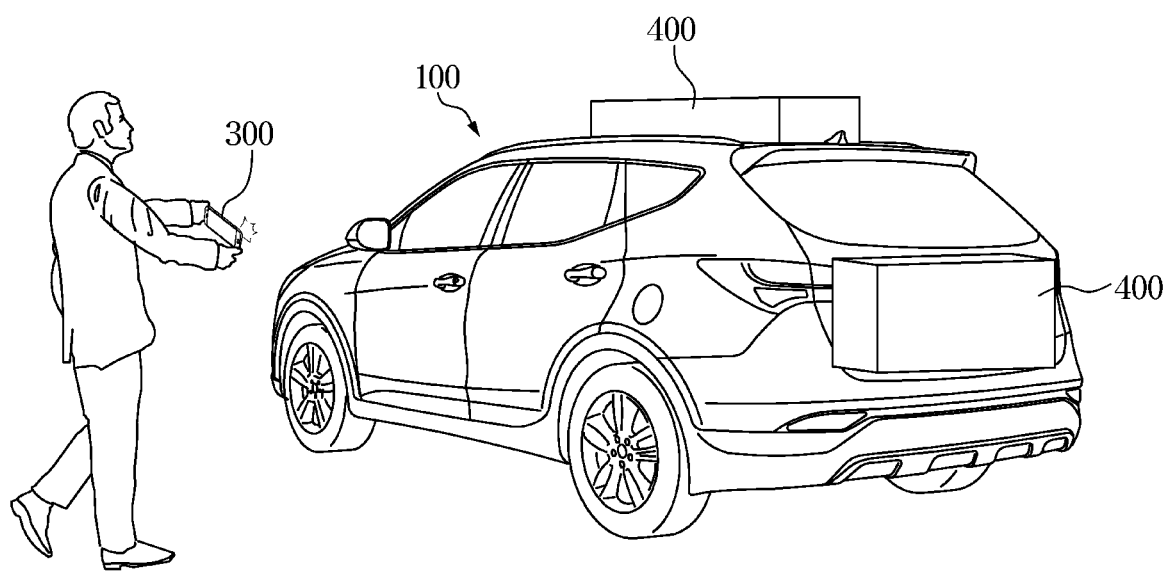
FIG. 6 is a diagram for describing an operation of determining a reference area based on an external appearance image of a vehicle received from a user terminal.

FIG. 6 is a diagram for describing a method of determining a reference area based on an external appearance image of a vehicle received from a user terminal.

Referring to FIG. 6, when determination of the reference area is not performable based on the external appearance image of the vehicle 100 acquired by the camera 110, the controller 160 may control the communicator 150 to transmit a signal requesting that the external appearance image of the vehicle 100 be photographed to the user terminal 300.

In response to receiving the signal requesting to photograph the external appearance image of the vehicle 100 from the vehicle 100, the user terminal 300 may display a request for photographing the external appearance image of the vehicle 100 on a display of the user terminal 300, or may output the request through a speaker of the user terminal 300.

The user may photograph an external appearance image of the vehicle 100 using a camera of the user terminal 300.

The user terminal 300 may transmit the external appearance image of the vehicle 100 photographed by the user to the communicator 150 of the vehicle 100.

The controller 160 may determine the reference area based on the external appearance image of the vehicle 100 received from the user terminal 300.

Unlike the above-described embodiment, the user may identify, in advance, a difficulty in acquiring information about the load piled on the outside of the vehicle 100 using the camera 110 of the vehicle 100.

In this case, the user may photograph the external appearance image of the vehicle 100 using the camera of the user terminal 300 in advance, and input a command to the user terminal 300 to transmit the external appearance image of the vehicle 100 photographed by the user to the communicator 150 of the vehicle 100.

That is, without the controller 160 transmitting a signal requesting that the external appearance image of the vehicle 100 be photographed to the user terminal 300, the user may photograph the external appearance image of the vehicle 100 using the camera of the user terminal 300 in advance. Even in this case, the controller 160 may determine the reference area based on the external appearance image of the vehicle 100 received from the user terminal 300.

At least one component may be added or omitted to correspond to the performances of the components described above. In addition, the mutual positions of the components may be changed to correspond to the performance or structure of the system.

Figure 7:
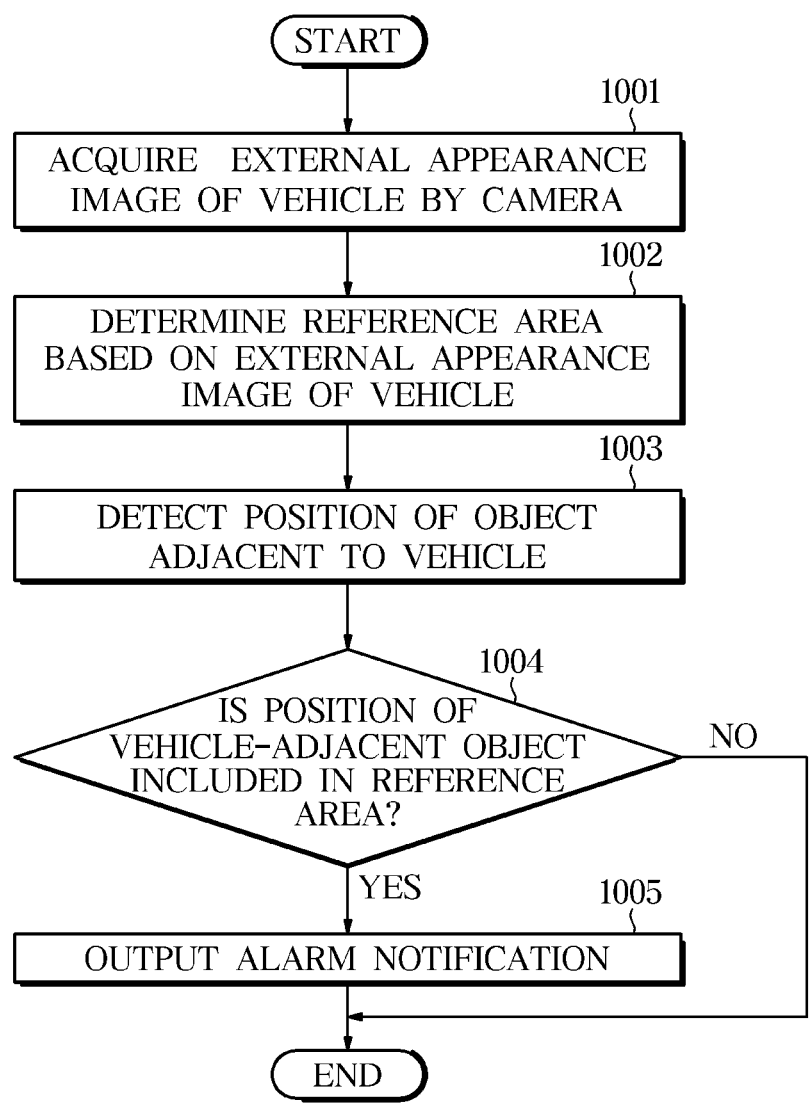
FIG. 7 is a flowchart showing a control method for outputting an alarm according to an embodiment.

FIG. 7 is a flowchart showing a control method for outputting an alarm according to an embodiment. This is only a preferred embodiment for achieving features of the disclosure, and it should be understood that some components may be added or deleted as needed.

Referring to FIG. 7, the camera 110 provided on the exterior of the vehicle 100 may acquire an external appearance image of the vehicle 100 (1001). In this case, the external appearance image of the vehicle 100 may include information about the load 400 piled on the outside of the vehicle 100. That is, the camera 110 may acquire an image of the load 400 piled on the outside of the vehicle 100.

The controller 160 may determine a reference area based on the external appearance image of the vehicle 100 (1002). In this case, the controller 160 may determine the reference area based on information about the load 400 piled on the outside of the vehicle 100 and included in the external appearance image of the vehicle 100.

When determination of the reference area is not performable based on the acquired external appearance image of the vehicle 100, the controller 160 may control the camera 110 to acquire a gesture image of the user. In this case, the controller 160 may determine the position indicated by the user based on the gesture image of the user, and determine the reference area based on the position indicated by the user.

The first sensor 120 may detect the position of an object adjacent to the vehicle 100 (1003).

The controller 160 may determine whether the detected position of the object adjacent to the vehicle 100 is included in the reference area (1004).

When the controller 160 determines that the position of the object adjacent to the vehicle 100 is not included in the reference area (NO in operation 1004), the alarm 170 may not output an alarm notification.

When the controller 160 determines that the position of the object adjacent to the vehicle 100 is included in the reference area (YES in operation 1004), the controller 160 may control the alarm 170 to output an alarm notification (1005).

FIG. 8 is a flowchart showing a control method for setting a travelling route according to an embodiment.

Referring to FIG. 8, the camera 110 provided on the exterior of the vehicle 100 may acquire an external appearance image of the vehicle 100 (2001).

The controller 160 may identify whether the reference area is determinable based on the external appearance image of the vehicle 100 acquired by the camera 110 (2002). For example, when the shape of the load piled on the outside of the vehicle 100 has a large number of irregularities, the controller 160 may not accurately determine the position of a protruding part of the load, which serves as a criterion for determining the reference area. That is, when the load piled on the outside of the vehicle 100 and included in the external appearance image of the vehicle 100 has a plurality of irregularities, the controller 160 may identify that the reference area may not be determinable based on the external appearance image of the vehicle 100.

When the controller 160 identifies that the reference area is determinable based on the external appearance image of the vehicle 100 acquired by the camera 110 (YES in operation 2002), the controller 160 may determine the reference area based on the external appearance image of the vehicle 100 (2003).

When the controller 160 identifies that the reference area is not determinable based on the external appearance image of the vehicle 100 acquired by the camera 110 (NO in operation 2002), the controller 160 may control the communicator 150 to transmit a signal requesting that the external appearance image of the vehicle 100 be photographed to the user terminal 300 (2004).

In response to receiving the signal requesting to photograph the external appearance image of the vehicle 100 from the vehicle 100, the user terminal 300 may display a request for photographing the external appearance image of the vehicle 100 on the display of the user terminal 300 or may output the request through the speaker of the user terminal 300.

The user may photograph the external appearance image of the vehicle 100 using the camera of the user terminal 300.

The communicator 150 may receive the external appearance image of the vehicle 100 photographed by the user from the user terminal 300 (2005).

The controller 160 may determine the reference area based on the external appearance image of the vehicle 100 received from the user terminal 300 (2006).

The controller 160 may receive road information from the navigation device and determine a travelling route to a destination based on the reference area and the road information (2007). In this case, the controller 160 may output a command to control autonomous driving to the driving part 180 so that the vehicle 100 travels along the determined travelling route.

As is apparent from the above, the vehicle according to an embodiment of the disclosure and the method of controlling the same, in response to a load being piled on an outside of the vehicle, can change an alarm area of a sensor provided in the vehicle based on information about the load acquired by a camera.

The vehicle according to an embodiment of the disclosure and the method of controlling the same can provide an alarm for collision avoidance in consideration of a load piled on an outside of the vehicle.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

What is claimed is:

1. A vehicle comprising:
    a short-range communication module configured to receive a signal from a digital key;
    a camera configured to acquire an external appearance image of the vehicle;
    a first sensor provided on an outside of the vehicle and configured to detect a position of an object adjacent to the vehicle;
    an alarm configured to output an alarm notification; and
    a controller configured to:
        control the camera to acquire the external appearance image of the vehicle based on the signal,
        determine a reference area based on the external appearance image of the vehicle, and
        control the alarm to output the alarm notification when the detected position of the object adjacent to the vehicle is within the reference area.

2. The vehicle of claim 1, wherein the controller is configured to determine the reference area based on information about a load piled on the outside of the vehicle and included in the external appearance image of the vehicle.

3. The vehicle of claim 1, further comprising a second sensor configured to detect an impact applied to the vehicle, wherein the controller is configured to control the camera to acquire the external appearance image of the vehicle when the impact is detected.

4. The vehicle of claim 1, wherein the camera is configured to acquire a gesture image of a user and the controller is configured to determine the reference area based on the gesture image of the user.

5. The vehicle of claim 4, wherein the controller is configured to:
    determine a position indicated by the user based on the gesture image of the user; and
    determine the reference area based on the position indicated by the user.

6. The vehicle of claim 4, wherein the controller is configured to control the camera to acquire the gesture image of the user when the reference area cannot be determined based on the external appearance image of the vehicle acquired by the camera.

7. The vehicle of claim 1, further comprising a communicator configured to communicate with a user terminal, wherein the controller is configured to determine the reference area based on the external appearance image of the vehicle received from the user terminal.

8. The vehicle of claim 7, wherein the controller is configured to control the communicator to transmit a signal to the user terminal requesting that the external appearance image of the vehicle be photographed, when the reference area cannot be determined based on the external appearance image of the vehicle acquired by the camera.

9. The vehicle of claim 1, further comprising a driving part configured to provide a rotational force for travel, wherein the controller is configured to:
    receive road information from a navigation system;
    generate a command to control autonomous driving of the vehicle based on the reference area and the road information; and
    output the command to control the autonomous driving to the driving part.

10. The vehicle of claim 9, wherein the controller is configured to:
    determine a travelling route to a destination based on the reference area and the road information; and
    output, to the driving part, the command to control the autonomous driving so that the vehicle is able to travel along the travelling route.

11. A method of controlling a vehicle, the method comprising:
    receiving a signal from a digital key;
    controlling a camera to acquire an external appearance image of the vehicle based on the signal;
    determining a reference area based on the external appearance image of the vehicle;
    detecting a position of an object adjacent to the vehicle; and
    controlling an alarm to output an alarm notification when the detected position of the object adjacent to the vehicle is within the reference area.

12. The method of claim 11, wherein determining the reference area comprises determining the reference area based on information about a load piled on an outside of the vehicle and included in the external appearance image of the vehicle.

13. The method of claim 11, further comprising:
    detecting an impact applied to the vehicle; and
    controlling the camera to acquire the external appearance image of the vehicle when the impact is detected.

14. The method of claim 11, further comprising:
    acquiring a gesture image of a user; and
    determining the reference area based on the gesture image of the user.

15. The method of claim 14, wherein determining the reference area based on the gesture image of the user comprises:
    determining a position indicated by the user based on the gesture image of the user; and
    determining the reference area based on the position indicated by the user.

16. The method of claim 14, wherein acquiring the gesture image of the user comprises controlling the camera to acquire the gesture image of the user when determining the reference area based on the external appearance image of the vehicle by the camera is not possible.

17. The method of claim 11, further comprising determining the reference area based on the external appearance image of the vehicle received from a user terminal.

18. The method of claim 17, further comprising controlling a communicator to transmit a signal to the user terminal requesting that the external appearance image of the vehicle be photographed when determining the reference area based on the external appearance image of the vehicle by the camera is not possible.

19. The method of claim 11, further comprising:
    receiving road information from a navigation system;
    generating a command to control autonomous driving of the vehicle based on the reference area and the road information; and
    outputting the command to control the autonomous driving to a driving part.

20. The method of claim 19, wherein outputting the command to control the autonomous driving to the driving part comprises:
    determining a travelling route to a destination based on the reference area and the road information; and
    outputting, to the driving part, the command to control the autonomous driving so that the vehicle travels along the travelling route.

21. A vehicle comprising:
a camera configured to:
    acquire an external appearance image of the vehicle; and
    acquire a gesture image of a user;
a first sensor provided on an outside of the vehicle and configured to detect a position of an object adjacent to the vehicle;
an alarm configured to output an alarm notification; and
a controller configured to:
    control the camera to acquire the gesture image of the user when a reference area cannot be determined based on the external appearance image of the vehicle acquired by the camera;
    determine the reference area based on the gesture image of the user; and
    control the alarm to output the alarm notification when the detected position of the object adjacent to the vehicle is within the reference area.

22. The vehicle of claim 21, wherein the controller is configured to:
    determine a position indicated by the user based on the gesture image of the user; and
    determine the reference area based on the position indicated by the user.

* * * * *